US007574553B2

(12) United States Patent
Squires et al.

(10) Patent No.: US 7,574,553 B2
(45) Date of Patent: Aug. 11, 2009

(54) DIGITAL COMPONENT POWER SAVINGS IN A HOST DEVICE AND METHOD

(76) Inventors: Christopher J Squires, 7295 W. 97th Pl., Westminster, CO (US) 80021; Scott E Burton, 11340 Fenton St., Westminster, CO (US) 80020; Douglas I McCampbell, 1523 Lodge La., Boulder, CO (US) 80303-8110; Larry J Koudele, 353 Shawnee La., Superior, CO (US) 80027; George C Cope, 340 Vasquez Rd., PO Box 608, Lyons, CO (US) 80540; James B French, Jr., 3609 Clover Creek La., Longmont, CO (US) 80503

( * ) Notice: Subject to any disclaimer, the term of this patent is extended or adjusted under 35 U.S.C. 154(b) by 399 days.

(21) Appl. No.: 11/454,493

(22) Filed: Jun. 16, 2006

(65) Prior Publication Data
US 2007/0294464 A1    Dec. 20, 2007

(51) Int. Cl.
*G06F 12/00*    (2006.01)
(52) U.S. Cl. ........................ 711/100; 365/227
(58) Field of Classification Search ................. 711/100; 365/227
See application file for complete search history.

(56) References Cited

U.S. PATENT DOCUMENTS

| 6,357,013 | B1 * | 3/2002 | Kelly et al. ................. 713/324 |
| 2002/0091978 | A1 * | 7/2002 | Higashida .................... 714/726 |
| 2004/0158747 | A1 * | 8/2004 | Kim ........................... 713/300 |
| 2005/0166015 | A1 * | 7/2005 | Bruner et al. ................ 711/112 |

* cited by examiner

Primary Examiner—Kevin L Ellis
Assistant Examiner—Hashem Farrokh
(74) Attorney, Agent, or Firm—Workman Nydegger

(57) ABSTRACT

A control arrangement, for example, in a digital component that forms part of a system, draws an input current for its operation and is configured for monitoring an interface for any one of a group of commands and, upon detecting an issued one of the group of commands, operates the component for executing the issued command in an operational mode, and during an idle time on the interface, the control arrangement exclusively monitors the interface for any one of the group of commands such that the input current is limited to a leakage current. The component may draw less than 1 milliamp of current during the idle mode.

16 Claims, 9 Drawing Sheets

DIGITAL COMPONENT POWER SAVINGS IN A HOST DEVICE AND METHOD

BACKGROUND

The present invention is generally related to reducing power consumption of a host digital device and, more particularly, to a control arrangement and associated technique used in a component that interfaces with the host device and limits power consumption of the component.

There is an ongoing desire to reduce power consumption in portable electronic units such as, for example, those units that employ digital technology. As functional capability of such portable units is enhanced over time and in view of another ongoing desire for miniaturization, the need for reducing power consumption may be brought into even further focus. Further, there is an ongoing need to provide for increased amounts of data storage in portable units. One approach, that is being used to satisfy this latter need, is the use of miniature hard disk drives. Such a miniature hard disk drive, however, is representative of a class of portable device components that can consume a significant amount of electrical power. Thus, power saving features, as applied to the use of a hard disk drive, are generally of interest with respect to the present discussion.

The prior art contains a number of examples which attempt to save power in the context of portable use of a hard disk drive. One approach, which is likewise applied even in the use of a hard drive in a desktop host computer, is to use the host computer to signal the hard drive to power down when the drive is not needed. This approach, however, requires monitoring and host resources to power down and wake up the drive. A related approach uses a timer in the hard drive to cause the drive to power down, should the timer time out prior to the hard drive becoming engaged in a data transfer. One concern, with respect to the use of a timer, relates to selection of an appropriate time out period. If the selected time out period is too short, the drive will often be re-started, which can itself consume additional power. Likewise, if the selected period is too long, power will be consumed without engaging in data transfers. The selection of this time period can be difficult when data transfers are often of different sizes and/or frequency.

Another class of prior art approach attempts to provide power savings during the actual operation of the drive. One instance of this latter type of approach is seen in U.S. Pat. No. 5,402,400, issued to Shrinkle et al (hereinafter the Shrinkle patent). The Shrinkle patent attempts to take advantage of the fact that there are times when a control system need only monitor servo information during operation of the drive for purposes of track following. Since the servo information occurs intermittently as servo sectors or wedges pass under the read heads, at least certain portions of the control circuitry can be shut down between the servo sectors, when the drive is not engaged in a read or write operation. This approach, however, is limited to power savings only during actual operation of the drive. Power savings may not be significant if data transfers occur only intermittently and are performed at relatively high data rates, in view of the amount of data that is being transferred.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described limitations have been reduced or eliminated, while other embodiments are directed to other improvements.

An apparatus and associated method are described for use in association with a first digital component in a system which includes a host device. The host device is configured for issuing a set of commands on an interface such that a group of the commands can be directed to the first digital component on the interface for use in executing an operational mode thereof and other ones of the commands can be directed to one or more different components that can be connected to the interface along with the first digital component. The interface is characterized by an idle time between the commands.

In one feature, a control arrangement is used in a way that draws an input current for operation thereof and is configured for monitoring the interface for any one of the group of commands and, upon detecting an issued one of the group of commands on the interface, operates the first digital component for executing the issued command in the operational mode, and during the idle time, the control arrangement exclusively monitors the interface for any one of the group of commands such that the input current is limited to a leakage current.

In another feature, a control arrangement is used to monitor the interface for any one of the group of commands and, upon detecting an issued one of the group of commands on the interface, operates the first digital component for executing the issued command in the operational mode, and during the idle time, the first digital component enters a coma mode in which the input current, that is drawn by the first digital component, is limited to a leakage current.

In still another feature, a monitoring arrangement is used to draw a monitoring input current in a monitoring mode and is configured for monitoring the interface, in the monitoring mode, for any one of the group of commands and, upon detecting an issued one of the group of commands on the interface, generates a wake-up signal and, during the idle time, the monitoring arrangement exclusively monitors the interface for any one of the group of commands such that the monitoring input current is limited to less than 1 milliamp during the idle time. An operating arrangement is configured for receiving the wake-up signal and, thereafter, for cooperating with the monitoring arrangement and the host device to execute the command in a normal operational mode.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown but is to be accorded the widest scope consistent with the principles and features described herein including alternatives, modifications and equivalents, as defined within the scope of the appended claims. It is noted that the drawings are not to scale and are diagrammatic in nature in a way that is thought to best illustrate features of interest. Further, like reference numbers are applied to like components, whenever practical, throughout the present disclosure. Descriptive terminology such as, for example, uppermost/lowermost, right/left, front/rear and the like may be adopted for purposes of enhancing the reader's understanding, with respect to the various views provided in the figures, and is in no way intended as being limiting.

Figure 1:
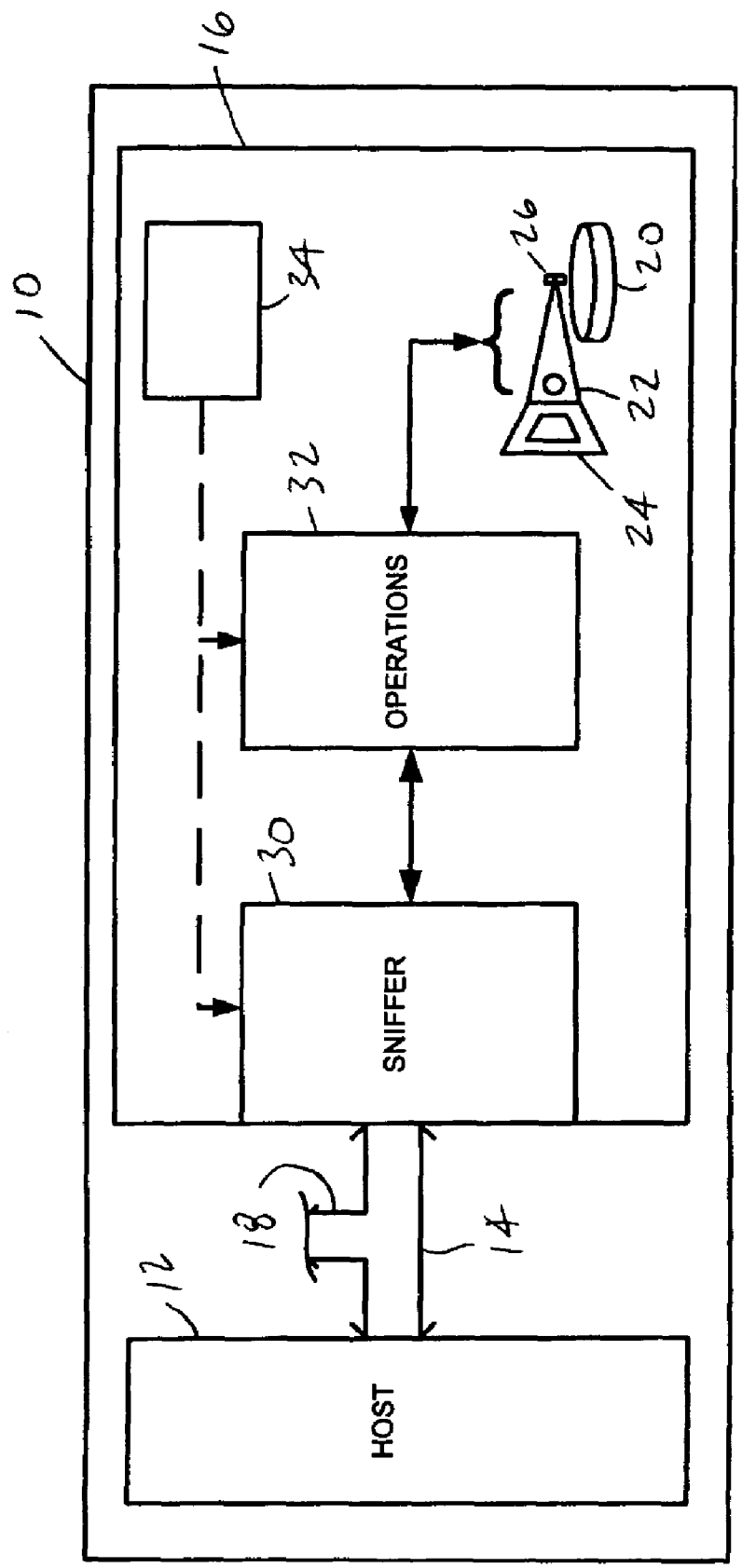
FIG. 1 is a block diagram of one embodiment of a device that includes a component that is provided with power saving features that are enabled by this disclosure.

Attention is now directed to the figures wherein FIG. 1 is a generalized block diagram of one embodiment of a device, generally indicated by the reference numeral 10, that is intended to be representative of any number of digitally implemented device types including, but not limited to wireless telephones, Internet appliances, personal digital assistants, music players, multi-function pagers, multimedia devices or any other device adaptable to use with an electromechanical digital storage device. The concepts taught herein are well suited for use when power savings is desirable such as, for example, in portable devices, but is not limited thereto.

Continuing with a description of FIG. 1, device 10 includes a host system 12 that is electrically connected with an interface 14. The latter may be any suitable form of interface such as, for example, ATA, SATA, CF, and USB. In some cases, there can be a physical interface that uses more than one protocol. Examples of this are the CE-ATA and ATA over MMC. In both cases, the physical interface is the same, but each has a different communication protocol. Other interfaces, either currently available or yet to be developed, can also be used, so long as some form of handshaking protocol is required when first "waking up" a component that is attached to the interface. That is, host system 12 requires a predetermined response from a component 16, through interface 14, prior to interacting further with that component. It is noted that most interfaces do allow this technology, as exemplified by the specific interface types that have been listed above. Interface 14 can be connected to a number of additional peripheral components, as indicated by an interface branch 18, although such additional devices have not been illustrated for purposes of clarity. In the present example, component 16 is a hard disk drive, which may be referred to interchangeably as a component, having a disk 20 that is supported for controlled rotation and an actuator assembly 22 including a voice coil motor 24 and a transducer arrangement 26 for performing data accesses using disk 20 in a well known manner. Other suitable components, that may be used in place of a hard disk drive, include but are not limited to a printing device, a wireless communication device and the like.

Hard drive 16 further includes a "sniffer" section 30, that monitors interface 14, as well as an operations section 32. Thus, sniffer 30, in this example, may be considered as an interface monitoring arrangement. A power supply section 34 can be configured, depending upon the specific embodiment, for supplying power to either sniffer 30 or operations section 32, or both. Hence, connections from power supply 34 are shown in phantom, using dashed lines. External power may be provided, as needed. Sniffer 30 monitors interface 14 for any commands that are issued, for example, by host 12. If a particular command is addressed to hard drive 16, the sniffer causes the hard drive to "wake up" and, thereafter, cooperate with operations section 32 for purposes of executing the command using actuator 22 and disk 20, in a manner that is known in the art. In the absence of command activity on interface 14, however, sniffer 30 and operations section 32 draw no more than leakage current as interface 14 is monitored. It is noted that the concept of leakage current will be familiar to those having ordinary skill in the art. Generally, leakage current refers to the current that is drawn by a transistor or gate in its off state. The value of leakage current varies according to the specific device technology that is used to form the gate. It is considered that the concepts that are taught herein are applicable to any device technology, although it is recognized that different device technologies invoke different leakage current values.

As noted above, sniffer 30 and operations section 32 will draw no more than leakage current when interface 14 is idle (i.e., no command is present). Details with respect to the way in which this occurs will depend upon the specific embodiment. In one embodiment, sniffer 30 draws leakage current in the idle state, while operations section 32 is completely unpowered. That is, no power is provided to the operations section. In another embodiment, sniffer 30 and operations section 32 both draw leakage current in the idle state. A number of embodiments will be described in detail immediately hereinafter. Applicants have implemented the sniffer interface monitoring technology, that has been brought to light herein, wherein the monitoring arrangement draws an input monitoring current of less than 1 milliamp in the interface idle mode and the component employing sniffer technology is a hard disk drive. In fact, the input monitoring current is approximately 500 microamps which comprises all current drawn by the hard disk drive in the idle or coma mode. In comparison with state-of-the-art hard disk drives, at the time of this writing, Applicants observed currents in the interface idle mode ranging from a lower value of approximately 10 milliamps at approximately 2.7 to 5.5 volts DC.

Figure 2:
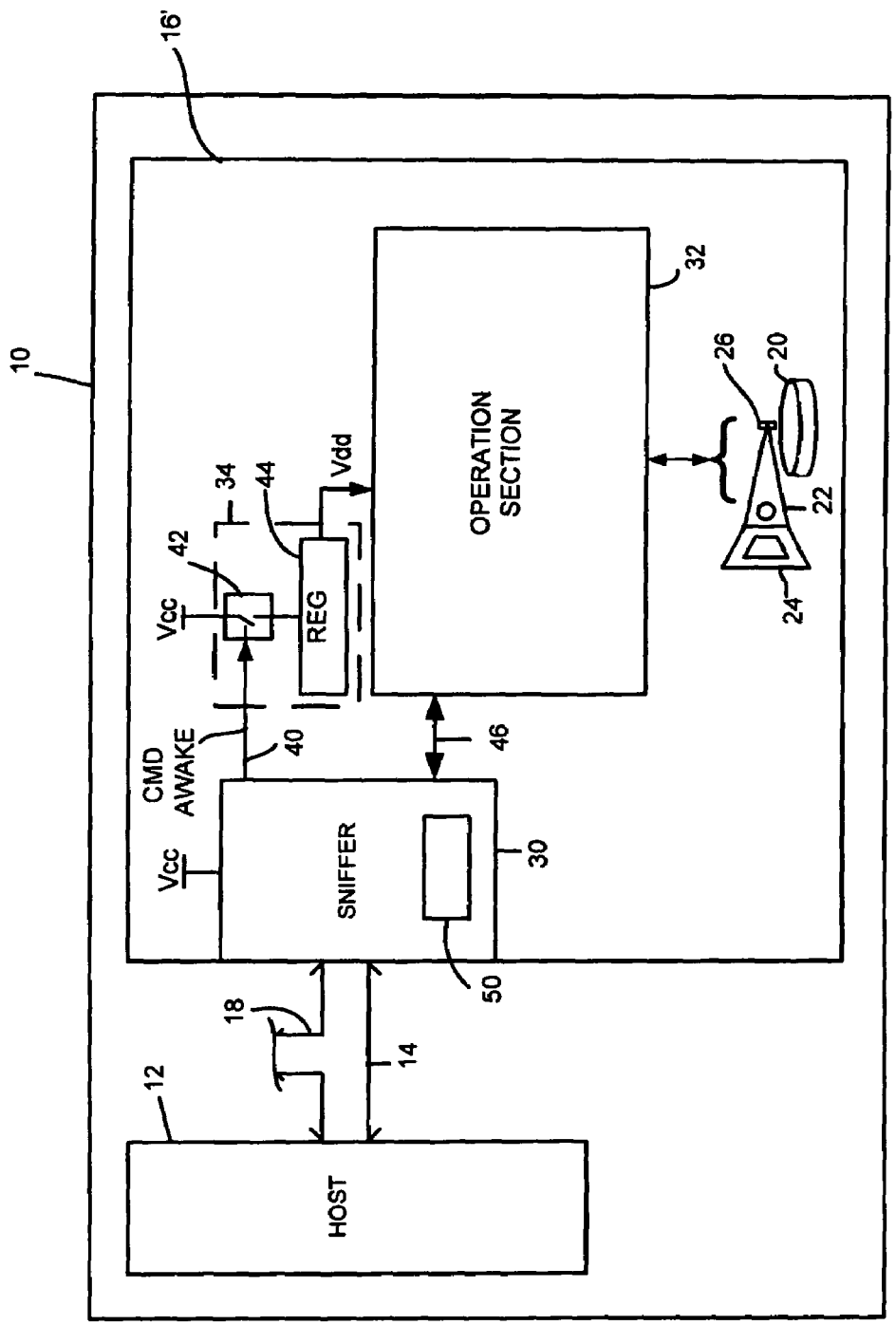
FIG. 2 is a block diagram of a system including one embodiment of a hard disk drive having power saving features which limit current that is drawn by a monitoring arrangement to a leakage current for purposes of monitoring an interface.

Turning now to FIG. 2, one embodiment of a hard disk drive, as part of system 10, is indicated by the reference number 16' and is diagrammatically shown in block diagram form. In this particular embodiment, sniffer 30 operates from an external power supply Vcc. Upon detection of command activity on interface 14, sniffer 30 places a CMD Awake line 40 in an active or asserted state which, in turn, causes a switch 42 to close, that provides Vcc to a regulator 44. It is noted that other embodiments may not have a CMD AWAKE signal per se, since there may be other methods of initiating device wake up. Regulator 44 can be any suitable form of regulator such as, for example, a switching regulator or linear regulator. Regulator 44 outputs a voltage Vdd that is supplied to operations section 32. In some cases, voltage Vdd may be a core logic voltage value that is used by an integrated circuit that forms part of the hard disk drive. One commonly used core logic voltage is 1.2 volts, however, other values may be used on the basis of the specific IC technology that is employed. The use of core logic, as part of an overall control integrated circuit will be familiar to those having ordinary skill in the art. Generally, core logic voltage Vdd is lower than Vcc. In the present example, sniffer 30 is not part of core logic and serves as a level converter between interface 14 and operations section 32. That is, signals on a sniffer interface 46, between the sniffer and operations section 32, are transferred using the core logic voltage value, Vdd. Accordingly, in the Idle mode, when no command activity is present on interface 14, command awake line 40 is low or deasserted so that switch 42 is open, thereby disabling operations section 32 such that no current is drawn by it. At the same time, during the Idle mode, sniffer 30 draws only leakage current from the external Vcc power supply. It is noted that the Idle mode may interchangeably be referred to as a "Coma" mode.

Still referring to FIG. 2, sniffer 30 becomes active once a command is placed on interface 14, for example, by host 12. This command is then compared with a subset of overall commands 50 which may be present on interface 14 and may be stored, for example, in a register arrangement that forms part of sniffer 30. The command subset will vary, depending on the specific type of interface that is selected as interface 14, as will be discussed in further detail below. It should be appreciated that a command within this command subset may be considered as any event that occurs on the interface which requires or is intended to solicit a response from the drive or component device. In the event that one of the commands of the command subset is present on interface 14, command awake line 40 is made active, such that regulator 44 produces Vdd. In this way, operation section 32 then performs an overall wake up procedure that causes hard drive 16' to enter a normal operations mode from the Coma mode, as will be described in further detail immediately hereinafter.

With the foregoing in mind, still further details will be described with reference to FIG. 3, which illustrates a system 10, including a specific embodiment of a hard disk drive that is produced consistent with the embodiment of FIG. 2 and generally indicated by the reference number 100. In the present example, the use of an ATA/IDE type interface is considered as interface 14. For this reason, the sniffer may be referred to as an "AT sniffer". This interface is currently used by many hard disk drives, and is specified by ANSI in extensive detail, for example, in a document that is entitled Information Technology-AT Attachment with Packet Interface-5 (ATA/ATAPI-5) which is incorporated herein by reference and may be referred to hereinafter as the ANSI Specification. Further, as mentioned above, the ATA interface protocol allows sniffer technology, due to its use of handshaking. In the present embodiment, drive 100 is implemented using a pair of integrated circuits (ICs) that are indicated as IC1 and IC2, within dashed boxes, and shown in functional block diagram form. It should be appreciated that IC1 further includes a core logic section 104 that is powered by a switchable core logic voltage Vdd, yet to be described.

Initially, it is assumed that drive 100 is powered down and in the aforedescribed Coma mode such that the input current to the drive is limited to leakage current that is drawn by sniffer 30. It is noted that there are three possible avenues by which hard drive 100 can be caused to enter the Coma mode, each of which can be used alone or in any combination:

1. The drive may be configured with a Vcc Power on Reset (POR) section 102 such that power initiation causes the drive to come up in Coma mode when power is provided. This feature can be selectable, so that the drive may or may not come up in Coma mode when Vcc power is first applied. One of ordinary skill in the art will be familiar with POR sections, at least in a general sense.
2. The drive can be commanded into Coma mode by host 12.
3. The drive can go into Coma mode by itself, for example, through the use of a programmable timer. In this case, the drive commands itself into the Coma mode, if no activity is detected for some predetermined period of time. This can be a hardware, software or firmware timer. There may be other methods for causing the system to enter the coma mode, where CMD AWAKE goes low. Any method is acceptable, so long as the concepts that have been brought to light herein are applied.

It is noted that the foregoing Coma mode entry paths are applicable with respect to all embodiments described herein.

When in Coma mode, Vcc provides power directly to AT sniffer 10 along with certain control logic that is outside of core logic section 104. The control logic includes a multiplexer 110 and a clock 112, along with associated logic that provides signals thereto. In particular, this associated logic includes a reset flip flop 118. In the present example, an RS flip flop is used, however, any suitable type of flip flop may be employed. It is noted that multiplexer 110 is used to select the source of a clock signal SE-CLK 120, as will be described further. Further, Vcc is provided to regulator 122 and Reset Out section 164. Accordingly, the interface monitoring arrangement of the present example includes all of these components which receive Vcc power in the idle/Coma mode.

During Coma mode, core logic 104 is unpowered. That is, a Vdd supply 122 forms part of IC2 and is disabled in the Coma mode so that core logic power Vdd is unavailable. In the present example, a switching power regulator is used for core logic supply 122 and provides Vdd to core logic 104 on a line 124, although any suitable source of Vdd may be used. In the present example, no current is drawn by core logic 104 during the Coma mode. In this regard, core logic 104 actually comprises most of IC1, including an AT interface 130, a processor 132 and a frequency synthesizer 134, all of which will be familiar to those having ordinary skill in the art.

Therefore, in the Coma mode, no clocks or oscillators are active, and current draw by IC1 and IC2 is limited to no more than leakage current that is drawn from the Vcc supply.

For this embodiment, using the ATA/IDE interface, each one of three things can "wake up" hard drive 100. In this regard, addresses are provided on interface 14 using three physical address lines, designated as DA 2:0, along with −CS0 and −CS1, as will be familiar to those having experience with the ATA/IDE interface and specified in detail in the above incorporated ANSI Specification. These wake up events include:

1. A command, which is issued using a write to Command Reg 7
2. A soft reset command, which is issued with a write of Bit 2 of Control Reg 6
3. A hard reset command, which is issued using a physical line on interface 14, that is pulled low and then released.

Irrespective of the specific initiating command or event, in all three cases, the wake up sequence is the same, as will be described immediately hereinafter.

Figure 3:
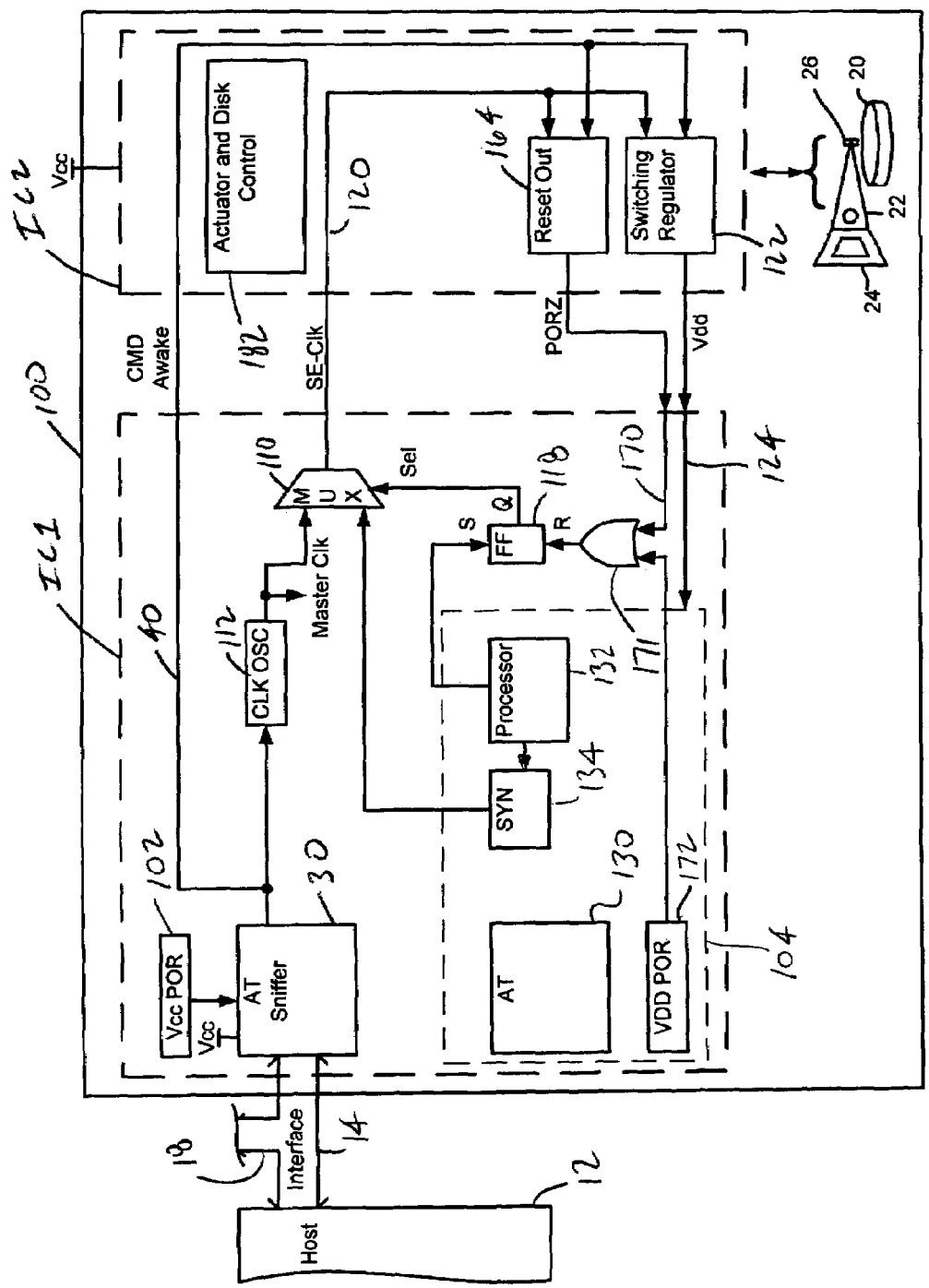
FIG. 3 is a block diagram of a system including a hard disk drive that is consistent with the system and hard disk drive of FIG. 2 for purposes of describing additional details with respect to its structure and operation.
Figure 4:
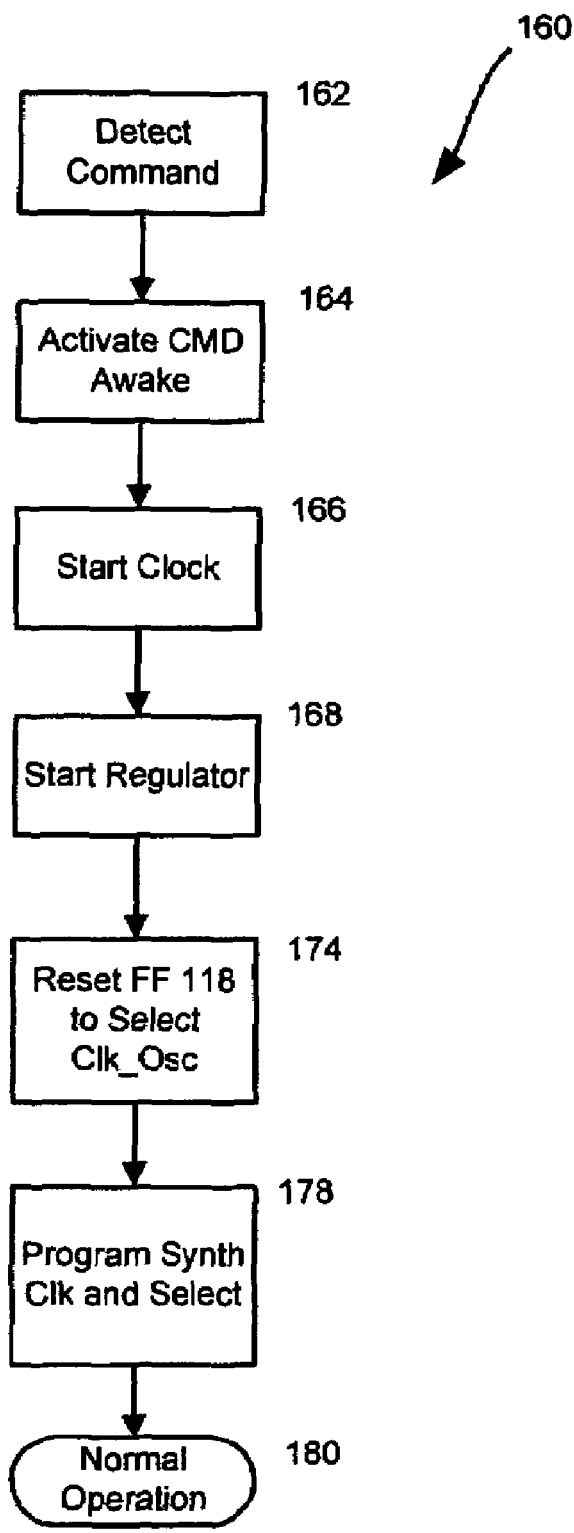
FIG. 4 is flow diagram which illustrates the operation of the hard disk drive of FIG. 3.

Referring to FIG. 4, in conjunction with FIG. 3, the sequence of events during wake up is illustrated in the form of a flow diagram that is generally indicated by the reference number 160. Initially, at 162 one of the commands of interest is detected. Thereafter, sniffer 30 sets command awake line 40 to its active state at step 164. The command awake signal (CMD Awake) is fed to switching regulator 122, as well as a Reset Out section 164. Responsive to the command awake signal, clock 112 is turned on in step 166 to generate a Master Clock signal and which is fed to multiplexer 110. In step 168, command awake on line 40 also causes regulator 122 to generate Vdd core power for IC1 and, more particularly, provides power for core logic section 104 of this IC. At least approximately at the same time, a power on reset signal PORZ on a line 170 becomes active (logic low, in the present example). This latter signal is provided to an "OR" gate 171 that includes another input from a Vdd POR section 172. When either one of the Vdd POR signal and the Reset Out signal are present at the inputs of OR gate 171, the latter resets flip flop 118 such that its output on a select (Sel) line causes multiplexer 110 to choose the SE_CLK signal 120, as being the output of Clock 112 at step 174, rather than synthetic clock 134. It is noted that the PORZ signal on line 120 stays active for a time duration that is sufficient to cause Vdd core power to stabilize, and for processor 132 to stably execute code. This time duration, for example, may be hundreds of microseconds to tens of milliseconds, depending on characteristics of the driven circuitry. Optionally, at 178 processor 132 may then program synthetic clock 134 to a different frequency, and then set multiplexer control flip flop 118 to select SYNTH CLK 134, instead of CLK OSC 112 for use as the SE_CLK signal. In either case, normal operation then ensues, with IC1 and IC2 fully powered-up, at step 180, during which normal data accesses in the form of read/write operations can be performed in a well-known manner using an actuator and disk control section 182.

Figure 5:
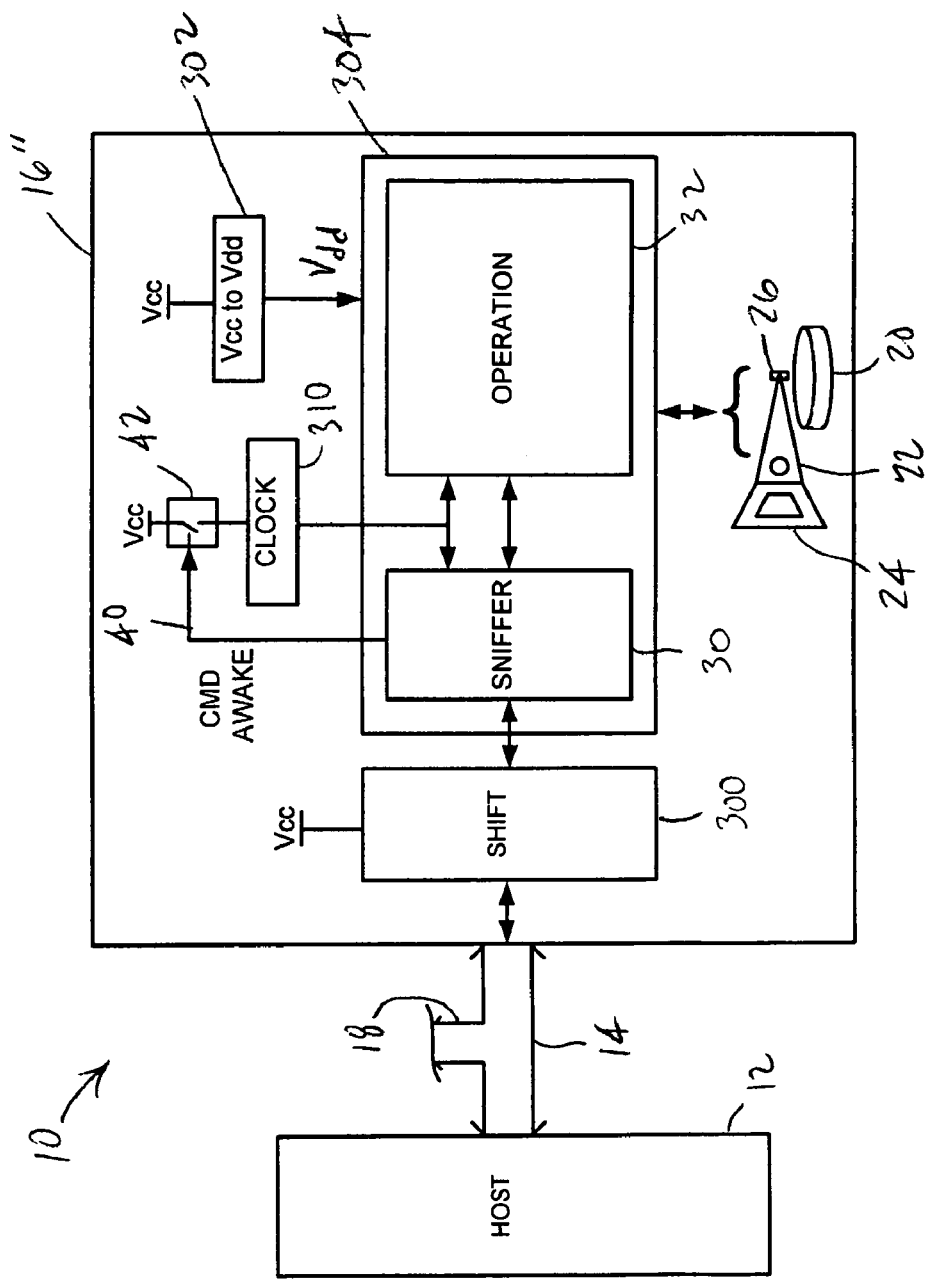
FIG. 5 is a block diagram of a system including another embodiment of a hard disk drive having power saving features which limit current that is drawn by a monitoring arrangement to a leakage current for purposes of monitoring an interface.

Attention is now directed to FIG. 5, which is a block diagram that illustrates another embodiment of a hard disk drive, designated by the reference number 16". It is noted that the level of detail that is intended in the present figure is comparable with that of FIG. 2 and that further details will be provided below, in the context of a more detailed discussion. In initially describing this embodiment, it is again initially assumed that the hard disk drive is in the Coma mode. Using sniffer technology in this embodiment, a level conversion section 300, powered from the externally originated Vcc supply, converts interface 14 voltages for compatibility with core logic voltage Vdd. Accordingly, sniffer 30 can then operate from the core logic voltage and may be integrated as a section of the core logic in an IC. In this regard, it is noted that conversion section 300 may be considered as a front end of the sniffer in drawing only leakage current during idle time periods on interface 14. Accordingly, the interface monitoring arrangement includes level shifter 300 and sniffer 30. Further, sections such as, for example, operations section 32 can be switched such that they are unpowered, so long as the monitoring functionality of sniffer 300 is maintained. Vdd, for such switching purposes, can be internally generated by an IC which includes a regulator for producing Vdd from Vcc and/or using an externally generated source for Vdd. It should be appreciated that a great deal of flexibility is provided with respect to the manner in which Vdd may be made available.

Core logic voltage is produced using a voltage regulator 302, which powers a core logic section 304, including sniffer 30 and operations 32. Switch 42 again receives command awake on line 40 wherein an open state of the switch disables a clock 310 and a closed state enables clock 310. Accordingly, the clock is disabled unless a command that requires a disk transfer is detected. More particularly, in the Idle mode, the interface monitoring arrangement, comprising level conversion section 300 and sniffer 30, draws only leakage current. It should be appreciated that operation section 32 likewise draws only leakage current, since clock 310 is disabled. In addition to the interface monitoring arrangement drawing only leakage current, regulator 302 can be designed to draw a limited current in providing Vdd, as compared to operating logic circuitry.

Upon receiving a command requiring a disk access, sniffer 30 logic will assert command awake to close switch 40 thereby powering clock 310. This causes clock signals to be fed to sniffer 30 and to operations section 32, so that drive 16" can process and respond to the command in an appropriate way in a normal operations mode.

Additional details will be now be described with reference to FIG. 6, which illustrates system 10, including a specific embodiment of a hard disk drive that is produced consistent with the embodiment of FIG. 5 and generally indicated by the reference number 400. In the present example, the use of a CE-ATA type interface is considered as interface 14. Moreover, this is another example of a sniffer being used in a HDD (hard disk drive). It is noted that this CE-ATA interface is also used by some HDDs. At the time of this writing, however, it is still quite new, and in some areas, still being defined. As will be seen, however, the concepts that have been brought to light herein are nonetheless equally applicable.

Still referring to FIG. 6, it is again assumed that drive 400 is initially in the Coma mode. Again, the Coma mode may have been entered at least through any one of the three entrance avenues that were described in detail above. When in Coma mode, external Vcc power is available and serves a regulator 402 of a suitable type such as, for example, a linear or switching regulator to produce a core logic voltage Vdd. Accordingly AT sniffer 30 is provided with core logic voltage Vdd. The sniffer, however, draws only leakage current from Vdd at least in part for the reason that all clocks and logic circuitry are idle or in a non switching state. As noted above, some sections may be unpowered, so long as sniffer functionality is maintained. Responsive only to the command awake signal 40, a clock oscillator 406 is turned on. In this way, no clock signal is generated thereby, during the idle interface mode. Accordingly, a multiplexer 410 is inactive and the SE-CLK signal is absent when command awake 40 is deasserted or low. There is, therefore, only leakage current drawn from the Vcc and Vdd power supply lines by the interface monitoring arrangement for purposes of monitoring interface 14 in the Idle mode. In this implementation, as compared to the one of FIG. 3, it is noted that more logic, including the sniffer, is Vdd based and can be integrated as core logic. Both implementations, however, exhibit the advantages that are associated with the concepts that have been brought to light herein such as, for example, drawing no more than leakage current for purposes of monitoring the interface and having the capability to wake up quickly when a relevant command is detected.

Figure 6:
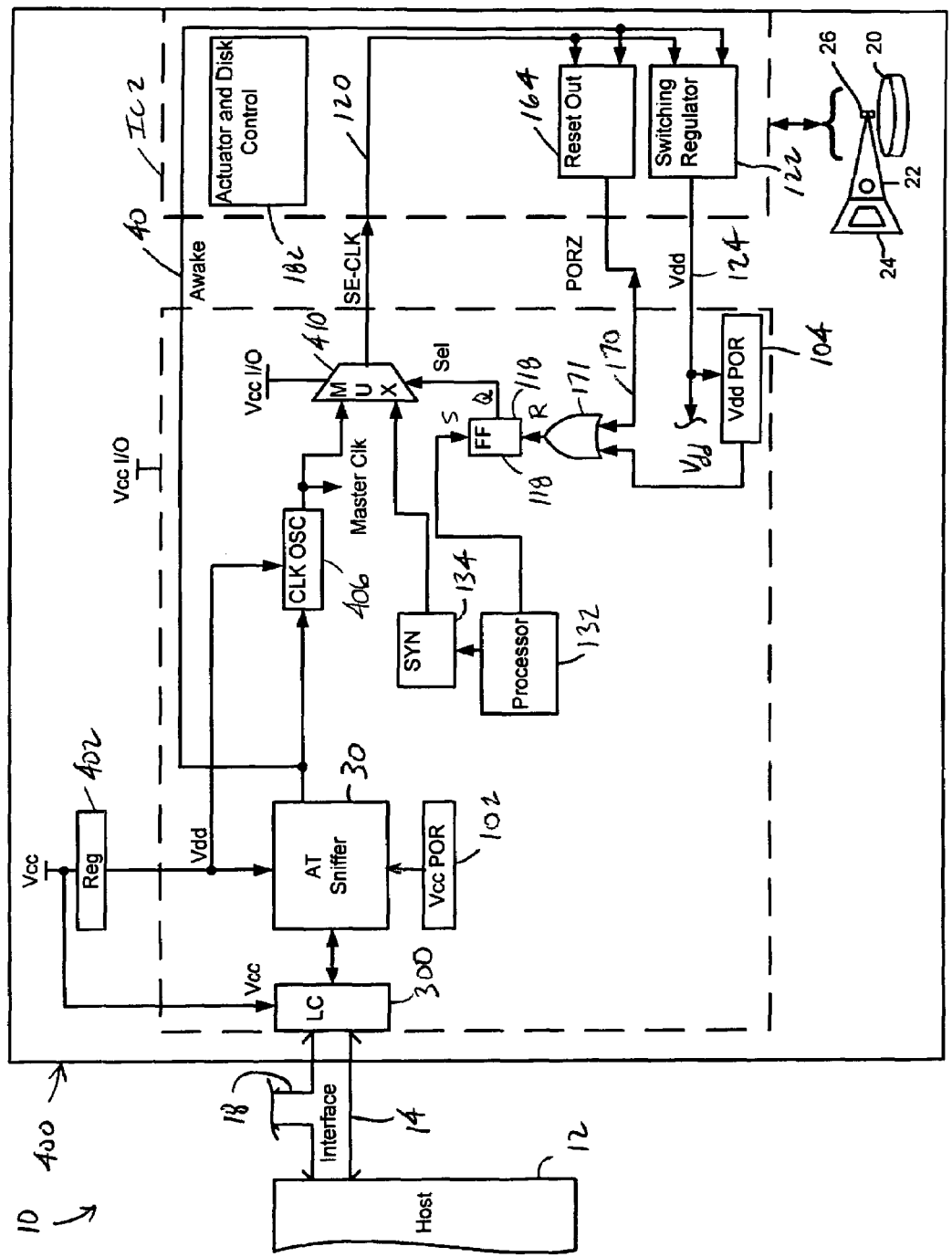
FIG. 6 is a block diagram of a system including a hard disk drive that is consistent with the system and hard disk drive of FIG. 5 for purposes of describing additional details with respect to its structure and operation.

As can be seen in FIG. 6, a small portion of Vdd digital circuitry is powered by Vdd regulator 402 which can be any suitable form of power supply. For transitioning and powering during the operational mode, aforementioned regulator 122 is activated. It is noted that Vdd regulator 402 may be integrated in IC1 or external to IC1.

For this exemplary implementation using the CE-ATA interface, each one of eight events can "wake-up" the HDD 400, including:
1. POR
2. Host reset
3. ATA command
4. CMD 6
5. CMD 60
6. CMD 12
7. CMD 8
8. CMD 60 or 56.

In this regard, it is considered that one having ordinary skill in the art will be familiar with these events which are described, for example, in the ANSI Specification which is incorporated herein by reference. Irrespective of the particular triggering event, the wake up sequence is the same, as will be described immediately hereinafter.

Figure 7:
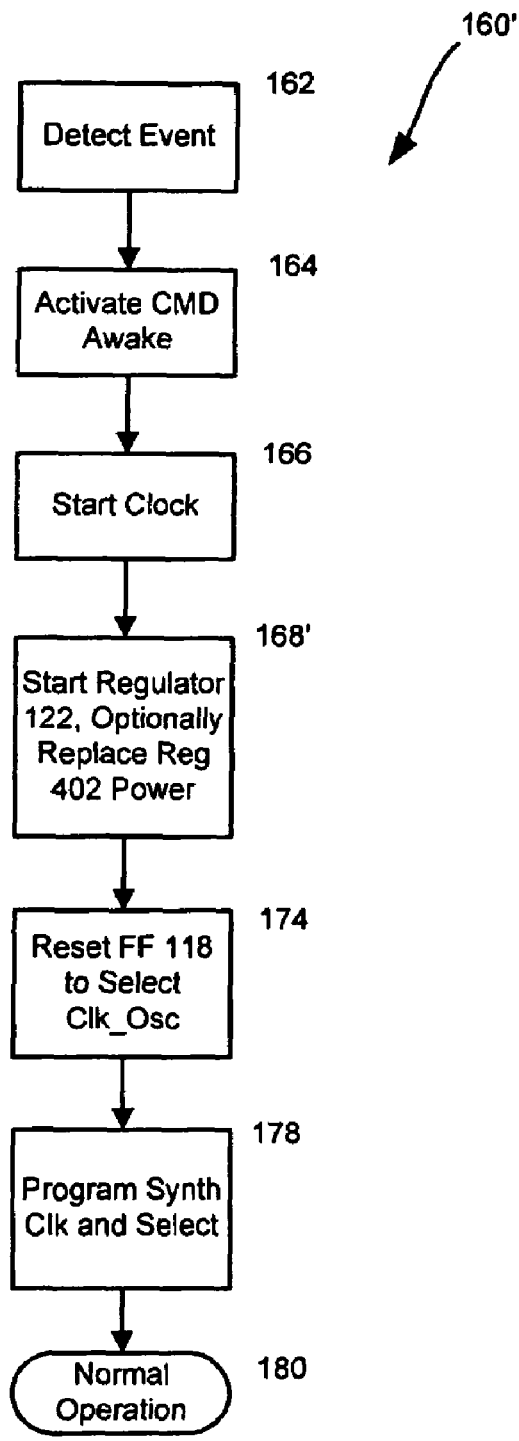
FIG. 7 is flow diagram which illustrates the operation of the hard disk drive of FIG. 6.

Turning now to FIG. 7 in conjunction with FIG. 6, attention is now directed to a startup sequence, generally indicated by the reference number 160', for transitioning drive 400 from the Coma mode to operational status. It is noted that the sequence resembles the sequence described with respect to FIG. 4. Accordingly, descriptions of like steps will not be repeated for purposes of brevity. One difference with respect to sequence 160', however, resides in step 168'. In this case, switching regulator 122 starts up and, optionally, Vdd power from regulator 402 may be replaced with Vdd power from regulator 122.

It should be appreciated that other embodiments are also possible. As one example, an embodiment might use internal IC switching to selectively provide sequential startup power to sections of IC I. In this way, much of the internal circuitry of the IC can be unpowered, thereby even further reducing leakage current.

Figure 8:
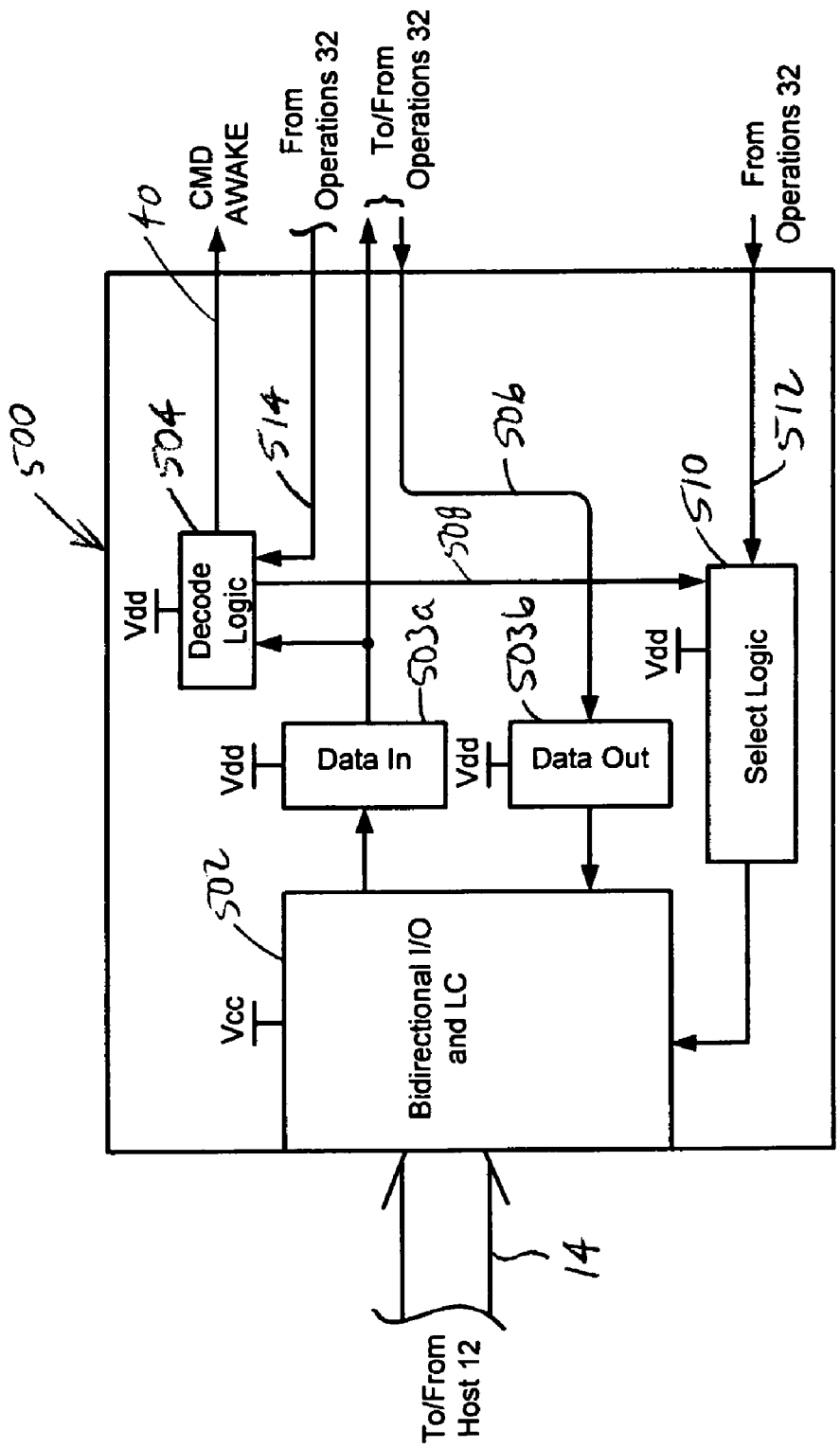
FIG. 8 is a block diagram that illustrates details with respect to a sniffer or monitoring section that is compatible with the hard disk drives of FIGS. 5 and 6.

Referring to FIG. 8, attention is now directed to details with respect to a sniffer section 500 that is compatible with the hard drives of FIGS. 5 and 6. In this example, sniffer section 500 includes a bidirectional I/O and level converter (LC) section 502. In this embodiment, the sniffer section is a hardware circuit, although other embodiments can incorporate sniffer technology in other ways to monitor interface 14. The interface, in this case is shown as bidirectional, but may be a unidirectional, input bus in some cases. Section 502 is powered by Vcc and converts logic levels between Vcc, the interface voltage supply, and Vdd, a different, generally lower voltage at which components that can be integrated in core logic operate. As should be evident from the discussions above, the level converter functionality may not be required, depending upon a specific application. Sniffer section 500 further includes Data In and Data Out buffers 503*a* and 503*b*, respectively, that communicate with interface 14 via section 502. Data In buffer 503*a* transfers interface 14 data to operations section 32 (see, for example, FIG. 1), as well as to decode logic section 504 for purposes of monitoring interface 14 activity. In this regard, decode logic section 504 can be configured to generate Command Awake signal 40 responsive to a particular command occurring on the interface or a sequence of events or commands on the interface. Operations section 32 transfers data to Data Out buffer 503*b* on a line 506. In the coma mode, decode logic section 504 is configured for asserting a sniffer enable signal on a line 508 that is connected to a select logic section 510. The latter is electrically connected to bidirectional I/O and LC section 502 such that section 502 causes interface 14 activity to be latched by buffer 503*a*. During normal operation mode, selection of the direction of data flow by section 502 is under control of a line 512 from operations section 32. Operations section 32 can initiate the coma mode using a line 514 that is connected to decode logic section 504.

Depending upon the type of interface and protocol used, a sniffer event or command can be considered as any event, command or sequence on interface 14 which requires a response from the sniffer technology enabled device. For a given interface, any communication from the host that requires a response from the sniffer enabled device requires sniffer decode logic section 504 to generate a positive decode, and hence create the CMD Awake signal on line 40. Hence, sniffer decode logic section 504 contains information relating to all events, including commands and/or sequences for which the interface that is in use requires a response from the sniffer enabled device.

One initial state of sniffer section 500, in the Coma mode, is attended by the command awake signal being deasserted (logic low, in the present example). Vcc power and Vdd power are present, but the current from each supply is limited to no more than leakage current. In this state, the sniffer section is waiting and monitoring for a wake up command as identified, for example, in decode logic section 504. As stated above, each particular interface will have corresponding particular commands which will define a set of sniffer wake up commands and/or sequences.

Responsive to a sniffer wake up event or command, sniffer decode logic 504 detects the event and causes the CMD Awake output to go active/asserted. Once CMD Awake is asserted, any appropriate actions can be performed such as, for example, activating an external power supply and/or activating logic circuitry (not shown), which may include a processor and a clock signal.

Once the complete system is active, including clock signals, the sniffer section and other sections in the sniffer enabled device go active including, for example, a processor (see, for example, processor 132 of FIG. 6), such that the command can be serviced, with an appropriate response on interface 14.

Once the sniffer section wakes up the system, the system remains powered and fully operational, for example, until the processor determines that it is time to go back into Coma (low power sniffer enabled) mode. As discussed above, this situation can result from a time-out of an internal processor timer, determining that no interface communication has occurred for some period of time, or host 12 issuing a command which orders the sniffer enabled device to go into Coma mode. In any case, when it is time for the sniffer enabled device to go back into Coma mode (with the sniffer enabled), the processor will set active or assert a Coma mode line 514, which will cause the CMD Awake signal to go inactive or deasserted and which will arm the sniffer decode logic, and externally turn off clock signals. The sniffer enabled device is then back in sniffer mode, awaiting the next wake up initiating command.

It should be appreciated that, if sniffer section 500 loses power, then upon power restoration, the sniffer section can be designed or configured to either come up in either low power, coma mode (CMD AWAKE low) or active mode (CMD AWAKE high).

The drive/component can be commanded to go to sleep by several different methods. One is a timer, which can activate anytime there is lack of activity or communication between the host and device. This can be a hardware, software or firmware timer. Another method is for the host to send over a sleep command. There may be other methods of causing the component device to go back to sleep, where CMD AWAKE goes low. Any method is acceptable and within the scope of this disclosure so long as the teachings herein are applied.

It should be appreciated that additional features can make a sniffer enabled system even more power efficient, including, for example, adaptive timers and the like.

Figure 9A:
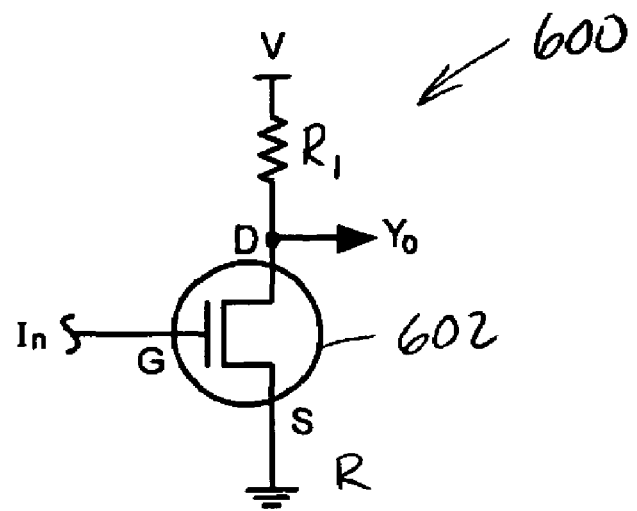
FIGS. 9a and 9b are schematic diagrams which illustrate circuitry that can be used to limit input currents to leakage currents for monitoring purposes.

Turning now to FIG. 9a, attention is directed to specific circuitry, generally indicated by the reference number 600 that may be connected to an interface line $I_n$ that is intended to serve as an exemplary line, as part of aforedescribed interface 14. In particular, $I_n$ is connected to a gate G of an NMOS transistor 602. A resistor $R_1$ is connected from a supply voltage V, which may be, for example, Vcc, to a drain D of transistor 602, while a source S of the transistor is connected to a suitable return R. An output $Y_o$ is used to drive subsequent circuitry. It should be appreciated that, when $I_n$ is in a logic low state, as is the case when the interface is in the idle mode, transistor 600 will only draw leakage current from supply V. A similar arrangement can also be used to drive an interface line wherein only leakage current is drawn from supply V.

Figure 9B:
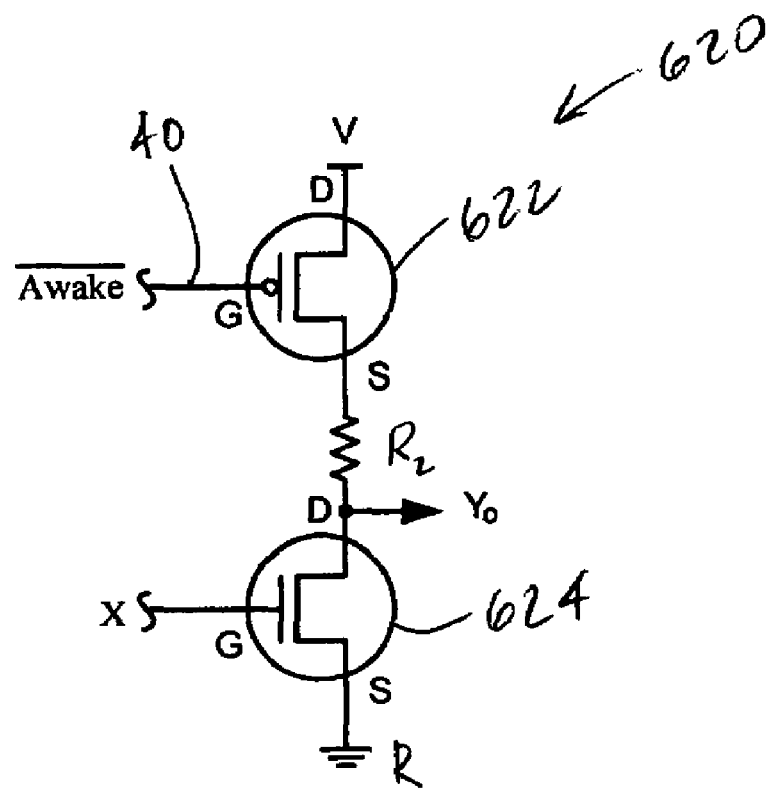

Referring to FIG. 9b, in certain design situations, other than connecting to the lines of interface 14, a circuit arrangement, that is generally indicated by the reference number 620, may be useful. In this example, an input signal X is contemplated which may be an external, active logic signal that can change states even when the sniffer should draw only leakage current. A drain D of a first PMOS transistor 622 is connected to supply V. Since the Awake signal or command 40, which is active low, as indicated by an overbar, is connected to gate G of transistor 622, this transistor is biased on when the Awake command is low. Source S of transistor 622 is connected to a resistor $R_2$ that is, in turn, connected to drain D of a second, NMOS transistor 624. Input signal X is connected to gate G of transistor 624, while source S is connected to return R. Accordingly, transistor 622 will turn on only when the active low awake command signal is in a logic low state. Otherwise, gate G of transistor 622 will be in a logic high state which will turn off transistor 622. Thus, no more than a leakage current can be drawn from supply V, even though signal X is active.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a first digital component, for use with a host device, said host device being configured for issuing a set of commands on an interface such that a group of said commands can be directed to the first digital component on said interface for use in executing an operational mode thereof and other ones of said commands can be directed to one or more different components that can be connected to said interface along with said first digital component, and which interface is characterized by an idle time between said commands, an apparatus comprising:

a control arrangement that draws an input current for operation thereof and is configured for monitoring said interface for any one of said group of commands and, upon detecting an issued one of the group of commands on said interface, operates the first digital component for executing the issued command in the operational mode, and during said idle time, said control arrangement exclusively monitors said interface for any one of said group of commands such that said input current is limited to a leakage current;

wherein said control arrangement includes a first section for monitoring said interface during said idle time and which draws said leakage current during the idle time and a second section that is configured to cooperate with the first section during said operational mode to execute said issued command and which second section is powered down by the first section when said first section draws said leakage current such that the second section is unpowered during the idle time.

2. The apparatus of claim 1 wherein said second section forms at least a portion of a core logic section that operates at a core logic voltage and said first section operates at a different voltage.

3. The apparatus of claim 1 wherein said different voltage is greater than the core logic voltage.

4. The apparatus of claim 1 wherein said first digital component is a hard disk drive.

5. The apparatus of claim 1, further comprising:

a power section for using an external power source to generate a core voltage value for operating said control arrangement, during said idle time, such that said power section provides no more than said leakage current as the control arrangement provides for exclusive monitoring of the interface.

6. The apparatus of claim 5 wherein said power section includes a linear regulator for providing at least a portion of said leakage current during the idle time.

7. In a first digital component, for use with a host device, said host device being configured for issuing a set of commands on an interface such that a group of said commands can be directed to the first digital component on said interface for use in executing an operational mode thereof and other ones of said commands can be directed to one or more different components that can be connected to said interface along with said first digital component, and which interface is characterized by an idle time between said commands, a method comprising:

configuring a control arrangement, that draws an input current for operation thereof, for monitoring said interface for any one of said group of commands and, upon detecting an issued one of the group of commands on said interface, for operating the first digital component to execute the issued command in the operational mode, and further configuring the control arrangement for exclusively monitors said interface, during said idle time, for any one of said group of commands such that said input current is limited to a leakage current;

wherein said control arrangement is configured with a first section for monitoring said interface during said idle time and which draws said leakage current during the idle time and with a second section to cooperate with the first section during said operational mode to execute said issued command and powering down said second section, using the first section, when said first section draws said leakage current such that the second section is unpowered during the idle time.

8. In a first digital component, for use with a host device, said host device being configured for issuing a set of commands on an interface such that a group of said commands can be directed to the first digital component on said interface for use in executing an operational mode thereof and other ones of said commands can be directed to one or more different components that can be connected to said interface along with said first digital component, and which interface is characterized by an idle time between said commands, an apparatus comprising:
- a monitoring arrangement that draws a monitoring input current in a monitoring mode and is configured for monitoring said interface, in the monitoring mode, for any one of said group of commands and, upon detecting an issued one of the group of commands on said interface, generates a wake-up signal and, during said idle time, said monitoring arrangement exclusively monitors said interface for any one of said group of commands such that said monitoring input current is limited to less than 1 milliamp during said idle time; and
- an operating arrangement that is configured for receiving said wake-up signal and, thereafter, for cooperating with the monitoring arrangement and the host device to execute the command in a normal operational mode.

9. The apparatus of claim 8 wherein said first digital component is a disk drive.

10. In a first digital component, for use with a host device, said host device being configured for issuing a set of commands on an interface such that a group of said commands can be directed to the first digital component on said interface for use in executing an operational mode thereof and other ones of said commands can be directed to one or more different components that can be connected to said interface along with said first digital component, and which interface is characterized by an idle time between said commands, a method, comprising:
- configuring a monitoring arrangement for drawing a monitoring input current in a monitoring mode and for monitoring said interface, in the monitoring mode, for any one of said group of commands and, upon detecting an issued one of the group of commands on said interface, generating a wake-up signal and, during said idle time, said monitoring arrangement is further configured for exclusively monitoring said interface for any one of said group of commands such that said monitoring input current is limited to less than 1 milliamp during said idle time; and
- arranging an operating section for receiving said wake-up signal and, thereafter, for cooperating with the monitoring arrangement and the host device to execute the command in a normal operational mode.

11. The method of claim 10 wherein said first digital component is a disk drive.

12. A computer system comprising:
- a host device having a data bus; and
- a plurality of peripheral devices each coupled to the data bus, the host device configured to output commands to each of the plurality of peripheral devices over the data bus;
- wherein a first device of the plurality of peripheral devices includes a control section and an operational section, wherein the control section is programmed to evaluate the commands and, if an address of one of the commands corresponds to the first device, to turn on power to the operational section;
- wherein the control section is configured to turn off power to the operational section and to draw no more than a leakage current following an idle time in which no commands addressed to the first device are output over the host bus.

13. A method for conserving power in a system having a host device and one or more peripheral devices coupled to the host device by an interface, the host device configured to output commands to the one or more peripheral devices through the interface, the method comprising:
- transmitting a plurality of commands from the host device through the interface;
- monitoring the plurality of commands transmitted on the interface by means of a control section of a first device of the one or more peripheral devices, the control section drawing no more than a leakage current while monitoring the plurality of commands; and
- upon detecting one of the commands addressed to the first device, turning on power to an operational section of the first device, the operational section executing the commands addressed to the first device.

14. The method of claim 13, further comprising turning off power to the operational section by means of the control section and reducing current to the control section to the leakage current following an idle period in which no commands addressed to the first device are transmitted.

15. The method of claim 13, wherein drawing no more than the leakage current comprises drawing no more than one milliamp.

16. The method of claim 13, wherein turning on power to the operational section comprises causing a power regulator to convert a first voltage to a second voltage lower than the first voltage, the power regulator having an output coupled to the operational section.

* * * * *

UNITED STATES PATENT AND TRADEMARK OFFICE
CERTIFICATE OF CORRECTION

PATENT NO. : 7,574,553 B2  Page 1 of 1
APPLICATION NO. : 11/454493
DATED : August 11, 2009
INVENTOR(S) : Squires et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Seventh Day of September, 2010

David J. Kappos
*Director of the United States Patent and Trademark Office*